United States Patent [19]

Cramer, Jr. et al.

[11] Patent Number: 4,981,390

[45] Date of Patent: Jan. 1, 1991

[54] TOLERANCE RING WITH RETAINING MEANS

[75] Inventors: Arthur A. Cramer, Jr., Hinsdale; Brian S. Cramer, Manhattan, both of Ill.

[73] Assignee: The Ray Engineering Co., Ltd., England

[21] Appl. No.: 379,694

[22] Filed: Jul. 13, 1989

Related U.S. Application Data

[63] Continuation of Ser. No. 23,004, Mar. 6, 1987, abandoned.

[51] Int. Cl.$^5$ .............................................. F16B 7/04
[52] U.S. Cl. ................................. 403/371; 403/372; 403/355
[58] Field of Search ............... 403/371, 369, 372, 365, 403/326, 357, 351, 360, 377, 319, 315, 355, 375, 376

[56] References Cited

U.S. PATENT DOCUMENTS

| | | |
|---|---|---|
| 1,662,544 | 3/1928 | Solenberger . |
| 2,897,026 | 7/1959 | Haller et al. . |
| 2,931,412 | 4/1960 | Wing . |
| 2,950,937 | 8/1960 | Bedford, Jr. ......................... 403/372 |
| 3,061,386 | 10/1962 | Dix et al. . |
| 3,142,887 | 8/1964 | Hulck et al. . |
| 3,145,547 | 8/1964 | Lyons . |
| 3,156,281 | 11/1964 | Demi .............................. 403/371 X |
| 3,197,243 | 7/1965 | Brenneke . |
| 3,233,497 | 2/1966 | McCormick .................... 403/376 X |
| 3,396,554 | 8/1968 | Westercamp ................... 403/355 X |
| 3,700,271 | 10/1972 | Blaurock et al. . |
| 3,838,928 | 10/1974 | Blaurock et al. . |
| 4,222,310 | 9/1980 | Garrett et al. ................... 403/372 X |
| 4,286,894 | 9/1981 | Rongley . |
| 4,376,254 | 3/1983 | Hellman . |

FOREIGN PATENT DOCUMENTS

| | | | |
|---|---|---|---|
| 455722 | 4/1949 | Canada ............................... | 403/371 |
| 238798 | 4/1910 | Fed. Rep. of Germany . | |
| 1337146 | 7/1963 | France . | |
| 1372974 | 11/1974 | United Kingdom . | |

OTHER PUBLICATIONS

Advertisement from "Electrical Apparatus Electro Mechanical Bench Reference"-1985, p. 53.

Primary Examiner—Peter M. Cuomo
Attorney, Agent, or Firm—Hill, Van Santen, Steadman & Simpson

[57] ABSTRACT

A tolerance ring is provided with radial projections to achieve unidirectional or bidirectional axial retention, or angular retention relative to at least one abutting cylindrical surface. Spaced tabs, dimples or a continuous flange formed at one or both axial ends of the ring provide the axial retention function by engaging with one or two shoulders on the abutting cylindrical surfaces, and a radially projecting tab at a lateral end of the split ring provide the angular retention function by engaging in a groove in the abutting cylindrical surface. The axial and angular retention projections can project radially inwardly or outwardly depending on the particular application, and the axial and angular retention projections can be used individually or in combination as desired.

29 Claims, 4 Drawing Sheets

TOLERANCE RING WITH RETAINING MEANS

This is a continuation of application Ser. No. 023,004 filed Mar. 6, 1987, now abandoned.

BACKGROUND OF THE INVENTION

1. Field of the Invention

The present invention relates to tolerance rings and more particularly to means for retaining the tolerance ring axially and/or angularly with respect to an abutting surface.

2. Description of the Prior Art

Tolerance rings are generally formed as split ring members having a corrugated surface and are sandwiched between two cylindrical surfaces, that is, an outer cylindrical surface and an inner cylindrical surface, to provide frictional engagement between two members having the respective cylindrical surfaces. The corrugations on the ring may protrude inwardly from an outer surface thereof, outwardly from an inner surface thereof or alternatively inwardly and outwardly. Such tolerance rings are illustrated in U.S. Pat. Nos. 3,142,887 and 3,145,547. The corrugations on the tolerance rings may be of varying heights or may be arranged in more than one row around the circumference of the ring as is illustrated in U.S. Pat. Nos. 3,700,271; 3,838,928 and 4,286,894.

U.S. Pat. No. 3,061,386 discloses a tolerance ring in which the adjacent ends of the transversely split ring are bent inwardly to form butt portions 14, presumably to prevent overlap of the adjacent ends of the ring.

U.S. Pat. No. 2,931,412 discloses a corrugated spring steel bushing in which the corrugations are provided along the entire axial length of the bushing and a stop flange 17 is provided at one end of the bushing, formed after the corrugations have been formed in the length of the bushing. Thus, the stop flange 17 includes the corrugations. A bearing sleeve 11 is provided which is inserted into the bushing 16, and the bearing sleeve 11 has an axial key 13 which engages in an inner groove formed by the corrugations of the locking sleeve to prevent the bearing sleeve 11 from rotating relative to the bushing 16.

When tolerance rings are used in some applications, particularly vertical orientations, where the axis of the ring is vertical, and where there is sufficient vibration, there may be a tendency for the tolerance ring to "walk" out of its position in an axial direction. If the tolerance ring were to completely "walk" out of its original position, frictional engagement between the two members would be greatly reduced, thus resulting in a loss of torque transfer between the members, misalignment of the members, etc.

Also, in some instances during repair and replacement work on the parts joined by tolerance rings, the cylindrical surfaces engaged by the rings may be inadvertently or intentionally changed in size slightly causing a looser fit of the ring than is specified. In such instances, the tendency for the ring to "walk" in an axial direction is enhanced.

These instances result in undesirable axial movement of the ring. Efforts to solve this problem in the past have been to modify the parts engaged by the rings to add lips or to peen over edges of the openings into which the rings are inserted, causing additional expense and having problematical results.

Similarly, the rings may be subject to some rotational slippage when sandwiched between two rotating parts if vibration is sufficiently great or if the sizes of the cylindrical surfaces are out of the specified ranges.

Therefore, it would be an advantageous development if there were a means to inexpensively and assuredly prevent the tolerance rings from moving axially and/or rotationally from their intended positions.

SUMMARY OF THE INVENTION

The present invention provides for a means to retain a tolerance ring in an axial or angular position relative to one or both of the cylindrical surfaces which it is engaging. The tolerance ring has at least one row of corrugations projecting from a surface thereof and has a planished area between adjacent corrugations and at both axial ends of the row of corrugations. An axial retaining means in the form of a continuous flange or angularly spaced, radial projection such as spaced tabs or dimples is formed at one or both axial end planished areas to engage with a shoulder on an abutting cylindrical surface so as to provide at least unidirectional axial retention of the ring relative to that surface. The ring may be provided with such retaining means at each axial end thereof to provide bidirectional axial retention of the ring relative to the abutting surfaces.

While the corrugations may extend either inwardly or outwardly from the planished area of the tolerance ring, the retaining means may also project radially inwardly or outwardly from the axial end portions of the tolerance ring and, in the case of a retaining means at both axial ends of the ring, the retaining means may both project inwardly or outwardly or one may project inwardly while the other projects outwardly.

The present invention also provides for angular retention means in the form of one or more inwardly or outwardly turned ends at the split end of the ring which project beyond the height of the corrugations to engage in a key way formed in the abutting cylindrical surface. This will prevent the tolerance ring from rotating relative to that cylindrical surface.

DESCRIPTION OF THE PREFERRED EMBODIMENTS

Figure 1:
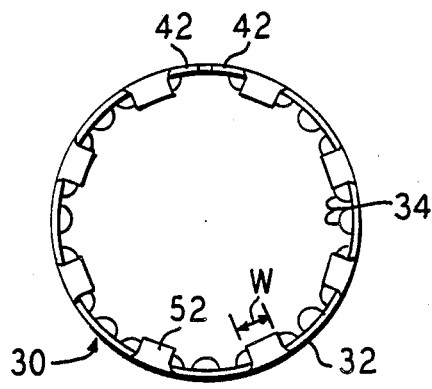
FIG. 1 is a plan view of a tolerance ring embodying the principles of the present invention including radially inwardly projecting discontinuous axial retention means.
Figure 2:
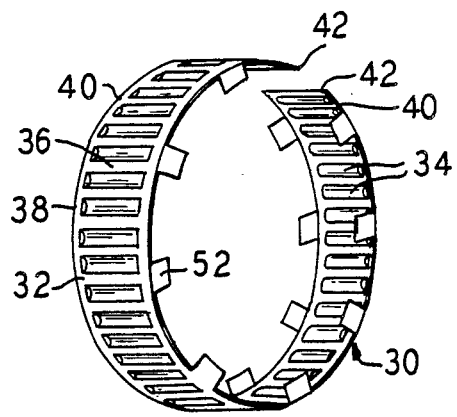
FIG. 2 is a perspective view of the tolerance ring illustrated in FIG. 1.
Figure 3:
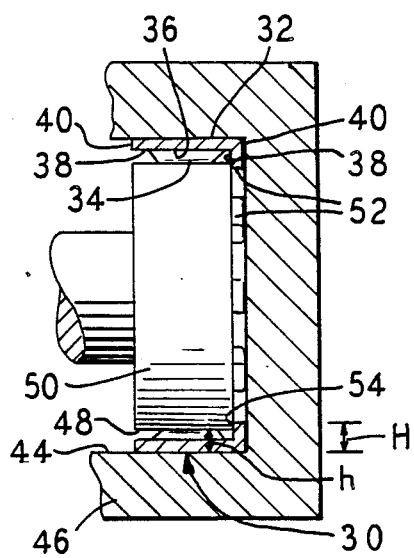
FIG. 3 is a side sectional view of an embodiment of the tolerance ring of FIG. 1 having a single end unidirectional axial retention means.

FIGS. 1–4 illustrate a tolerance ring generally at 30 embodying the principles of the present invention which has a cylindrical outer surface 32 and a plurality of radially inwardly projecting corrugations 34. As seen in FIGS. 2 and 3, the tolerance ring 30 includes planished areas 36 between adjacent radially inwardly projecting corrugations 34 and planished areas 38 located adjacent to axial ends 40 of the ring. The planished areas 36, 38 provide the cylindrical outer surface 32 of the ring, the planished areas 38 provide a continuous cylindrical surface along each axial end of the ring and the planished areas 36 provide an interrupted cylindrical surface between each of the radially projecting corrugations 34.

The tolerance ring 30 is formed as a split ring having lateral ends 42 which are slightly spaced apart in the case of a ring such as that shown in FIGS. 1–4 wherein the corrugations 34 project radially inwardly.

Figure 4:
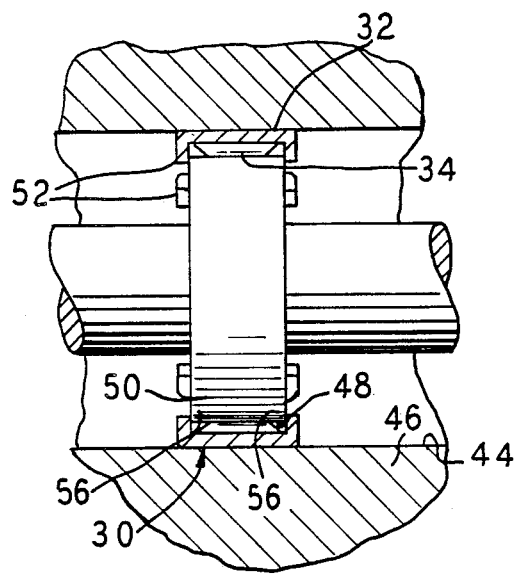
FIG. 4 is a side sectional view of the tolerance ring of FIG. 1 having a double end bidirectional axial retention means.

As illustrated in FIGS. 3 and 4, the tolerance ring 30 is sandwiched between an inner cylindrical surface 44 of an outer member 46 and an outer cylindrical surface 48 of an inner member 50. The tolerance ring assures a snug fit between the inner member 50 and outer member 46 and, in varying degrees, provides a means for the transfer of torque and axial resistance between the two members. The outer cylindrical surface 32 of the tolerance ring abuts against the inner cylindrical surface 44 of the outer member 46 and the corrugations 34 abut against the outer cylindrical surface 48 of the inner member 50.

FIGS. 1–4 illustrate an embodiment of a discontinuous axial retention means 52 which is in the form of a plurality of radially inwardly projecting tabs forming a discontinuous flange which, in the case of FIGS. 2 and 4 are formed along both axial ends 40 of the ring and, in FIG. 3, are illustrated as being formed along one axial end 40 of the ring.

As illustrated in FIG. 3, the retention means 52 has a height H which is at least slightly greater than a height h of the corrugations 34. In this manner, the retention means 52 will project beyond the height h of the corrugations and will be able to engage a shoulder 54 on the inner member 50 to prevent unidirectional axial movement between the tolerance ring 30 and the inner member 50. In the orientation of the illustration of FIG. 3, the retention means 52 engages the shoulder 54 and is prevented from moving axially to the left by such engagement. A width W of the tab retention means 52 can be selected to suit the particular application involved as can the number of tabs and their spacing.

As illustrated in FIG. 4, the tolerance ring 30 includes axial retention means 52 formed at both axial ends 40 of the tolerance ring 30 to prevent bidirectional axial movement of the tolerance ring 30 relative to the inner member 50 or its exterior cylindrical surface 48 by engaging shoulders 56 on each end of the inner member 50.

Figure 5:
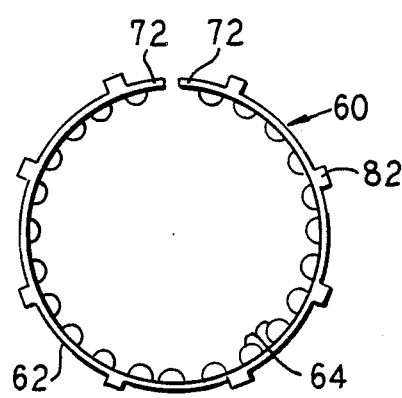
FIG. 5 is a plan view of a tolerance ring including radially outwardly projecting discontinuous axial retention means.
Figure 6:
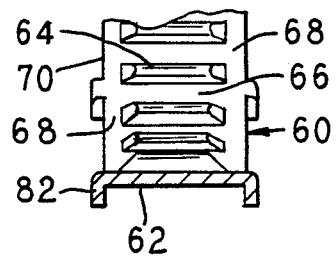
FIG. 6 is a partial side sectional view of the tolerance ring of FIG. 5 having a double end bidirectional axial retention means.
Figure 7:
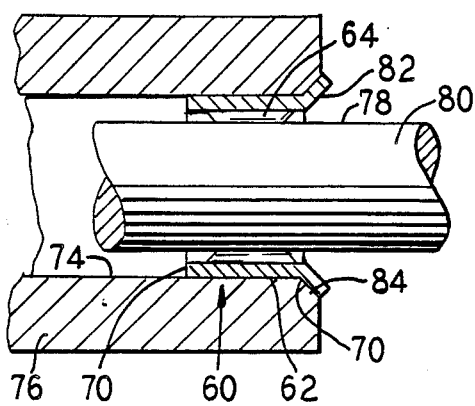
FIG. 7 is a side sectional view of an embodiment of the tolerance ring of FIG. 5 having a single end unidirectional axial retention means.

FIGS. 5–7 illustrate a tolerance ring 60 which again has a cylindrical outer surface 62 and a plurality of radially inwardly projecting corrugations 64. Furthermore, the ring 60 includes planished areas 66 between adjacent radially inwardly projecting corrugations 64 and planished areas 68 located adjacent to axial ends 70 of the ring.

Also, similarly to the ring illustrated in FIGS. 1–4, the ring 60 is formed as a split ring having lateral ends 72 which are spaced slightly apart.

As illustrated in FIG. 7, the tolerance ring 60 is sandwiched between an inner cylindrical surface 74 of an outer member 76 and an outer cylindrical surface 78 of an inner member 80.

FIGS. 5–7 illustrate an embodiment of a discontinuous axial retention means 82 which is in the form of a plurality of radially outwardly projecting tabs which, in the case of FIG. 6 are formed along both axial ends 70 of the ring and, in FIG. 7, are illustrated as being formed along one axial end 70 of the ring.

Since the tabs project in a radial direction opposite to the projection of the corrugation, the height of the tabs can be of any desired dimension which is sufficient to provide a retention engagement with the outer member 76. As illustrated in FIG. 7, the outer member 76 may have a chamfered opening or shoulder 84 and thus the tabs 82 may be formed at an angle other than 90° to the outer cylindrical surface 62 of the ring 60 such as the obtuse angle shown. Again, a width of the tab retention means 82 can be selected to suit the particular application involved as can the number of tabs and their spacing.

As illustrated in FIG. 6, the tolerance ring 60 includes axial retention means 82 formed at both axial ends 70 of the tolerance ring 60 to prevent bidirectional axial movement of the tolerance ring 60 relative to an outer member or its exterior cylindrical surface.

Figure 8:
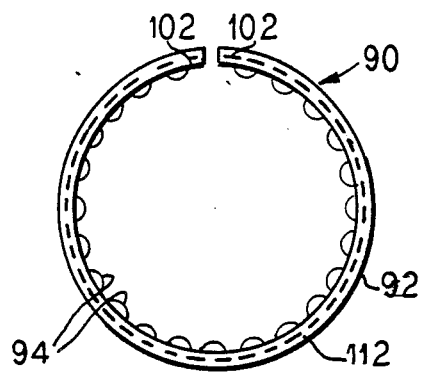
FIG. 8 is a plan view of a tolerance ring including radially outwardly projecting continuous axial retention means.
Figure 9:
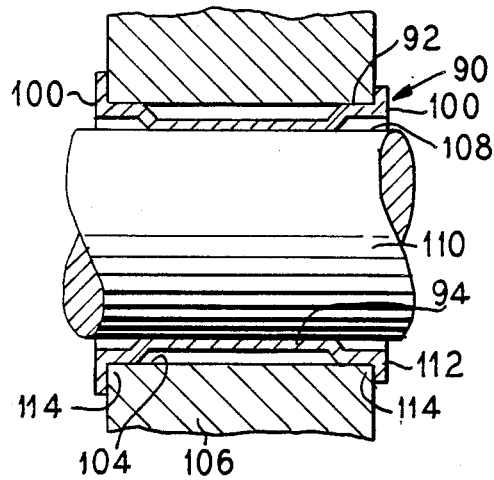
FIG. 9 is a side sectional view of the tolerance ring of FIG. 8 having a double end bidirectional axial retention means.
Figure 10:
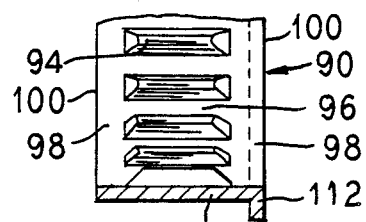
FIG. 10 is a partial side sectional view of an embodiment of the tolerance ring of FIG. 8 having a single end unidirectional axial retention means.

FIGS. 8-10 illustrate a tolerance ring generally at 90 which has a cylindrical outer surface 92 and a plurality of radially inwardly projecting corrugations 94. The tolerance ring 90 includes planished areas 96 between adjacent radially inwardly projecting corrugations 94 and planished areas 98 located adjacent to axial ends 100 of the ring.

The tolerance ring 90 is formed as a split ring having lateral ends 102 which are slightly spaced apart.

As illustrated in FIG. 9, the tolerance ring 90 is sandwiched between an inner cylindrical surface 104 of an outer member 106 and an outer cylindrical surface 108 of an inner member 110. The outer cylindrical surface 92 of the tolerance ring abuts against the inner cylindrical surface 104 of the outer member 106 and the corrugations 94 abut against the outer cylindrical surface 108 of the inner member 110.

FIGS. 8-10 illustrate an embodiment of a continuous axial retention means 112 which is in the form of a radially outwardly projecting continuous flange which, in the case of FIG. 9 is formed along both axial ends 100 of the ring and, in FIG. 10, is illustrated as being formed along one axial end 100 of the ring.

Since the flange 112 projects in an opposite radial direction from the projecting corrugations 94, the height of the flange 112 can be selected to suit the particular application. In the case of the flanges of FIG. 9, it may be that one flange has a height different than the other. The flange retention means 112 are to be sized and angled so as to provide appropriate axial retention of the tolerance ring 90 on the outer member 106 by engagement of the flanges 112 with shoulders 114 of the outer member. Since the ring is formed as a split ring, it can be squeezed into a smaller diameter to slip into the cylindrical opening formed in the outer member and, because of the spring nature of the ring, it will resume its original shape pressing against the inner cylindrical wall or surface 104 of the outer member 106.

Figure 10A:
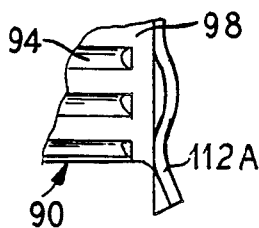
FIG. 10A is a partial side elevational view of an embodiment of the tolerance ring of FIG. 8 having a non-planar continuous axial retention means.

FIG. 10A illustrates a non-planar continuous axial retention means 112A which is in the form of a radially outwardly projecting continuous flange that has waves formed in it, such as the waves in a wave washer. That is, the flange projects radially at varying angles relative to the cylindrical surface of the ring around its circumference rather than at a fixed angle such as a right angle. Such a configured flange would provide the added function of acting as a thrust washer to absorb axial loads and vibrations.

Figure 11:
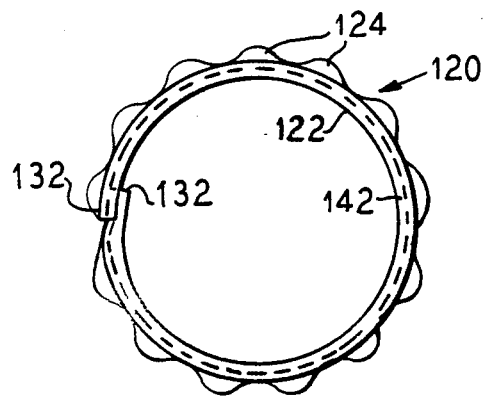
FIG. 11 is a plan view of a tolerance ring having a radially inwardly projecting continuous axial retention means.
Figure 12:
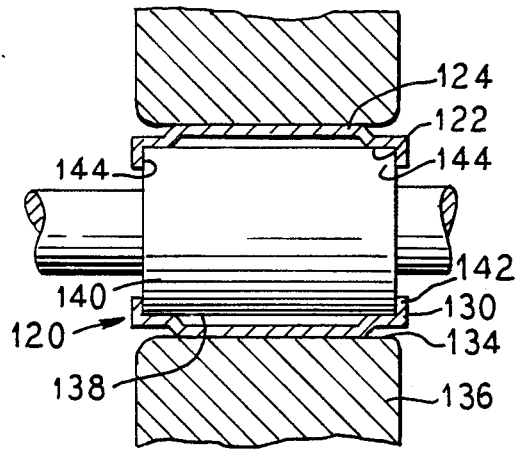
FIG. 12 is a side sectional view of the tolerance ring of FIG. 11 having a double end bidirectional axial retention means.
Figure 13:
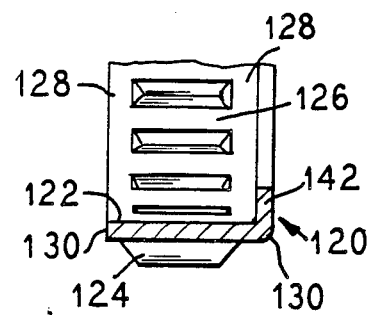
FIG. 13 is a partial side sectional view of an embodiment of the tolerance ring of FIG. 11 having a single end unidirectional axial retention means.

FIGS. 11-13 illustrate a tolerance ring at 120 which has a cylindrical inner surface 122 and a plurality of radially outwardly projecting corrugations 124. The tolerance ring 120 includes planished areas 126 between adjacent radially outwardly projecting corrugations 124 and planished areas 128 located adjacent to axial ends 130 of the ring. The planished areas 126, 128 provide the cylindrical inner surface 122 of the ring, the planished areas 128 providing a continuous cylindrical surface along each axial end of the ring and the planished areas 126 providing an interrupted cylindrical surface between each of the radially projecting corrugations 124.

The tolerance ring 120 is formed as a split ring having ends 132 which are slightly overlapping in the case of a ring such as that shown in FIGS. 11-13 wherein the corrugations 124 project radially outwardly.

As illustrated in FIG. 12, the tolerance ring 120 is sandwiched between an inner cylindrical surface 134 of an outer member 136 and an outer cylindrical surface 138 of an inner member 140. The inner cylindrical surface 122 of the tolerance ring abuts against the outer cylindrical surface 138 of the inner member 140 and the corrugations 124 abut against the inner cylindrical surface 134 of the outer member 136.

FIGS. 11-13 illustrate an embodiment of a continuous axial retention means 142 which is in the form of a radially inwardly projecting continuous flange which, in the case of FIG. 12, is formed along both axial ends 130 of the ring and, in FIG. 13, is illustrated as being formed along one axial end of the ring.

Since the flange retention means 142 projects in an axial direction opposite to that of the corrugations 124, the height of the flange and its angle can be selected to suit the particular application so that the flanges 142 will engage shoulders 144 of the inner member 140 to provide the bidirectional axial retention required. If the inwardly directed flanges were used in a ring having inwardly directed corrugations 124, then the height of the flanges 142 would have to be at least slightly greater than the height of the corrugations in order to provide the necessary engagement with the inner member.

Figure 14:
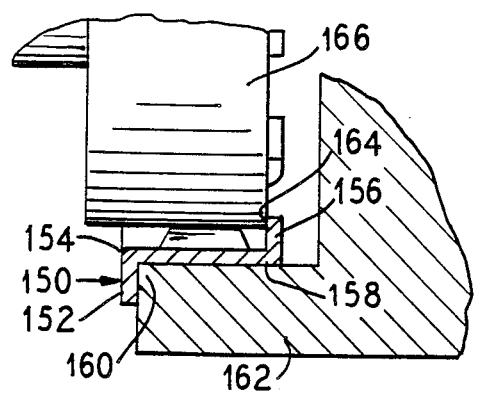
FIG. 14 is a partial side sectional view of a tolerance ring having double end bidirectional axial retention means with one retention means projecting radially inwardly and one retention means projecting radially outwardly.

FIG. 14 is an embodiment of a tolerance ring 150 which has a first axial retention means 152 formed at a first axial end 154 of the ring and a second axial retention means 156 formed at a second axial end 158 of the ring wherein the first axial retention means 152 projects radially outwardly and the second axial retention means 158 projects radially inwardly such that the first axial retention means 152 engages a shoulder 160 on an outer member 162 and the second axial retention means 156 engages a shoulder 164 on an inner member 166. The axial retention means can be either the discontinuous tab or dimples type or the continuous flange type, or a combination of the two as is desired for the particular application. The height, width, angle and spacing of the retention means at either end can be selected as desired for the particular application.

Figure 15:
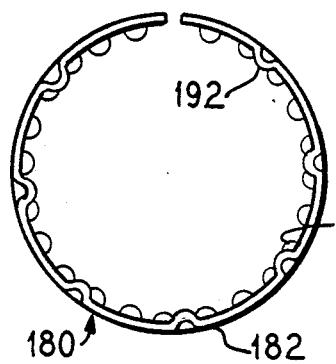
FIG. 15 is a plan view of a tolerance ring including radially inwardly projecting discontinuous retention means.
Figure 16:
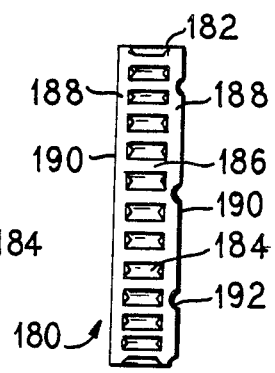
FIG. 16 is a side sectional view of an embodiment of the tolerance ring of FIG. 15 having a single end unidirectional axial retention means.
Figure 17:
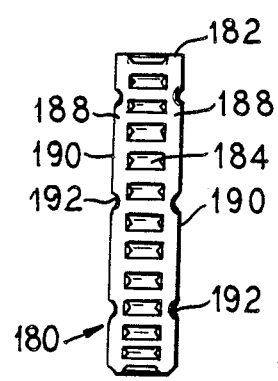
FIG. 17 is a side sectional view of the tolerance ring of FIG. 15 having a double end bidirectional axial retention means.

FIGS. 15-17 illustrate a tolerance ring generally at 180 which has a cylindrical outer surface 182 and a plurality of radially inwardly projecting corrugations 184. The tolerance ring 180 includes planished areas 186 between adjacent radially inwardly projecting corrugations 184 and planished areas 188 located adjacent to axial ends 190 of the ring.

FIGS. 15-17 illustrate an embodiment of a discontinuous axial retention means 192 which is in the form of a plurality of radially inwardly projecting dimples formed in the planished areas 188 which, in the case of FIG. 16 are formed along one axial end 190 of the ring and, in FIG. 17, are formed along both axial ends 190 of the ring.

Since the dimple retention means 192 has a radial direction the same as the corrugations 184, the dimples must have a height at least slightly greater than that of the corrugations in order to adequately engage an inner member which the ring is to surroundingly abut.

Figure 18:
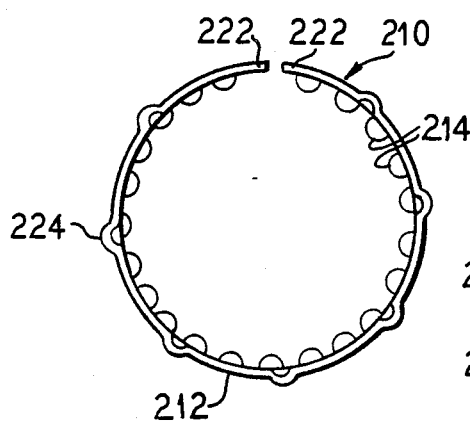
FIG. 18 is a plan view of a tolerance ring including radially outwardly projecting discontinuous axial retention means.
Figure 19:
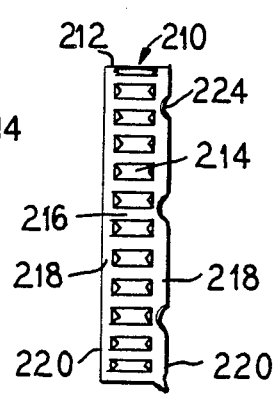
FIG. 19 is a side sectional view of an embodiment of the tolerance ring of FIG. 18 having a single end unidirectional axial retention means.
Figure 20:
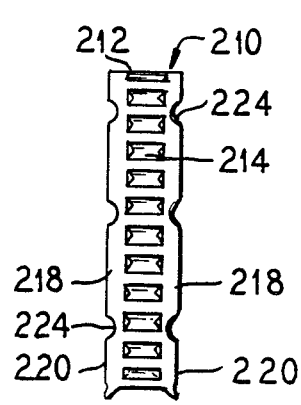
FIG. 20 is a side sectional view of the tolerance ring of FIG. 18 having a double end bidirectional axial retention means.

FIGS. 18-20 illustrate a tolerance ring generally at 210 which has a cylindrical outer surface 212 and a plurality of radially inwardly projecting corrugations 214. The tolerance ring includes planished areas 216 between adjacent radially inwardly projecting corrugations 214 and planished areas 218 located adjacent to axial ends 220 of the ring. The tolerance ring 210 is formed as split ring having ends 222 which are slightly spaced apart.

FIGS. 18-20 illustrate an embodiment of a discontinuous axial retention means 224 which is in the form of a plurality of radially outwardly projecting dimples which, in the case of FIG. 19 are formed in the planished area along one axial end of the ring and, in FIG. 20, are formed in the planished areas along both axial ends of the ring.

Since the dimples project in a radial direction opposite to that of the corrugations, the height of the dimples can be selected as desired for the particular application. The number and spacing of the dimples can also be selected according to the particular application.

Figure 21:
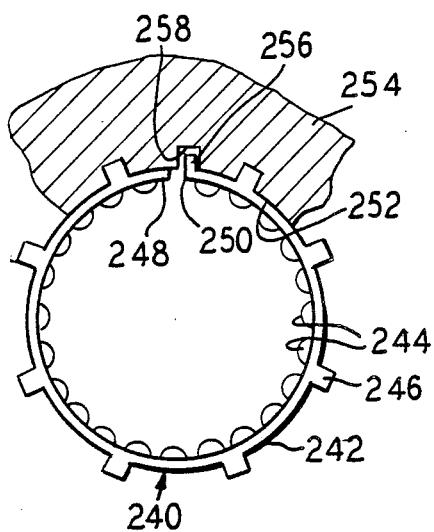
FIG. 21 is a plan view of a tolerance ring additionally having an angular retention means projecting radially outwardly.
Figure 22:
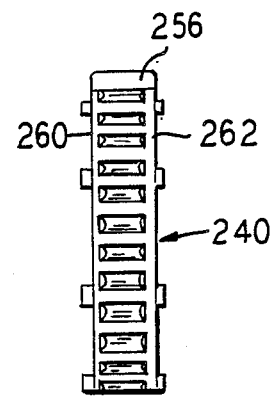
FIG. 22 is an embodiment of the tolerance ring of FIG. 21 illustrating a retention means with a width identical to the width of the tolerance ring.
Figure 23:
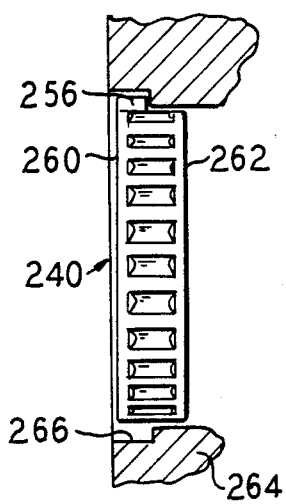
FIG. 23 is an embodiment of the tolerance ring of FIG. 21 having a retention means with a width less than the width of the tolerance ring.

FIGS. 21-23 illustrate a tolerance ring 240 having a cylindrical outer surface 242 and a plurality of radially inwardly directed corrugations 244. The ring is illustrated as having axial retaining means 246 in the form of radially outwardly directed spaced tabs, similar to those shown above in FIGS. 5-7. This ring is also a split ring having ends 248, 250 which are slightly spaced apart. The outer cylindrical surface 242 of the ring engages an inner cylindrical surface 252 of an outer member 254.

One of the ends 250 of the ring is provided with a radially outwardly projecting angular retention means 256 such as a tab which is received in a groove or keyway 258 formed in the outer member 254. The engagement of the angular retention means 256 with the groove 258 locks the ring angularly relative to the outer member 254 and its inner cylindrical surface 252 thereby preventing relative rotation between the two parts.

FIG. 22 is a side sectional view of the tolerance ring 240 as shown in FIG. 21 which illustrates that the angular retention means 256 is a tab which extends across the entire width of the ring. That is, it extends from one axial end 260 to the other axial end 262.

FIG. 23 illustrates an embodiment of the ring illustrated in FIG. 21 in which the angular retention means 256 is a tab which extends only a part of the way from the first axial end 260 to the second axial end 262. Since the tab is directed in a radial direction opposite to the projecting direction of the corrugations, the height of the tab can be selected as desired for the particular application involved.

The partial width tab 256 may also act as an axial retention means, for example when an outer member 264 has an inner groove 266 formed therein which would capture the tab in an axial direction.

Figure 24:
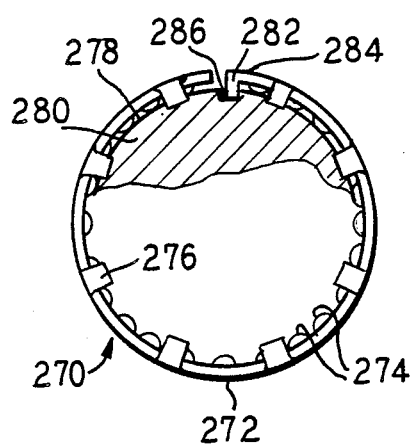
FIG. 24 is a plan view of a tolerance ring additionally having an angular retention means directed radially inwardly.

FIG. 24 illustrates a tolerance ring 270 having a cylindrical outer surface 272 and a plurality of inwardly directed corrugations 274 and an axial retention means 276 comprising a plurality of radially inwardly directed spaced tabs, similar to those illustrated in FIGS. 1-4 The corrugations 274 engage a cylindrical exterior surface 278 of an inner member 280.

The ring 270 is illustrated as having an angular retention means 282 formed at an end 284 of the split ring.

The angular retention means is shown as a radially inwardly directed tab which is received in a groove or keyway 286 of the inner member. The interlocking of the tab 282 with the groove 286 prevents relative rotation of the ring 270 relative to the inner member 280.

Since the tab is directed in a radial direction which is the same as the projecting direction of the corrugations 274, the tab must have a height at least slightly greater than the height of the corrugations. Other than that limitation, the tab height, width and placement can be varied as described above in connection with the radially outwardly directed angular retention means of FIGS. 21-23.

The axial retention means on the tolerance rings can be used in various combinations as described above, that is, directed radially inwardly or directed radially outwardly, on one axial end or both axial ends, and the angular retention means can also be varied, that is directed radially outwardly or directed radially inwardly, and, the two retention means, that is axial and angular, can be used individually or in combination in the various orientations depending upon the particular installation application.

The thickness of the tolerance rings can vary quite widely depending upon the particular application, and, Applicants have found that in some applications, the resistance to axial displacement has dictated a particular ring thickness and therefore stiffness of the tolerance ring rather than the particular radial load which the tolerance ring is required to carry. By providing an axial retention means on the tolerance ring, Applicants have found that the thickness of the tolerance ring can, in some applications, be reduced thereby reducing the cost of the tolerance ring while maintaining required performance levels.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

I claim as my invention:

1. In a tolerance ring, having a planished cylindrical wall defining a longitudinal axis and a plurality of axially elongated corrugations projecting radially from said wall along a part of an axial length of the ring, which is sandwiched between an inner cylindrical surface of an outer member and an outer cylindrical surface of an inner member, the improvement comprising:

an axial retention means projecting from said ring to engage a projecting shoulder on one of said members, said axial retention means comprising at least one radially projecting member, whereby said tolerance ring will engage one of said members along an entire length of said corrugations and will engage the other of said members with said planished cylindrical wall to provide a means for the transfer of torque between said two members and said axial retention means will prevent at least unidirectional axial movement of said ring relative to the member whose shoulder it engages, said shoulder being captured within axial ends of said ring by said axial retention means, said shoulder having one surface formed by one of said cylindrical surfaces and another surface which is overlayed by said axial retention means.

2. A tolerance ring according to claim 1, wherein said axial retention means projects radially inwardly to engage at least one shoulder on said inner member.

3. A tolerance ring according to claim 1, wherein said axial retention means projects radially outwardly to engage at least one shoulder on said outer member.

4. A tolerance ring according to claim 1, wherein said axial retention means projects radially inwardly at one axial end of said ring to engage a shoulder on said inner member and projects radially outwardly at a second axial end of said ring to engage a shoulder on said outer member.

5. A tolerance ring according to claim 1, wherein said axial retention means comprises a plurality of tabs projecting radially from at least one axial end of said ring.

6. A tolerance ring according to claim 5, wherein said tabs project radially from both axial ends of said ring to provide bidirectional axial retention.

7. A tolerance ring according to claim 5, wherein said tabs project radially at approximately a right angle to said cylindrical wall.

8. A tolerance ring according to claim 5, wherein said tabs projects radially at an obtuse angle to said cylindrical wall.

9. A tolerance ring according to claim 1, wherein said axial retention means comprises a continuous flange projecting radially from at least one axial end of said ring.

10. A tolerance ring according to claim 9, wherein said flange projects radially from both axial ends of said ring to provide bidirectional axial retention.

11. A tolerance ring according to claim 9, wherein said flange projects radially at approximately a right angle to said cylindrical wall.

12. A tolerance ring according to claim 9, wherein said flange projects radially at varying angles to said cylindrical wall around the circumference of said ring.

13. A tolerance ring according to claim 1, wherein said axial retention means comprises a plurality of radially projecting spaced dimples formed in the planished area adjacent to at least one axial end of said ring.

14. A tolerance ring according to claim 13, wherein said dimples project radially from both axial ends of said ring to provide bidirectional axial retention.

15. A tolerance ring according to claim 1, wherein said axial retention means projects in a radial direction, identical to a radial direction of the corrugations and a projecting height of said retention means is greater than a projecting height of said corrugations.

16. In a tolerance ring, having a planished cylindrical wall defining a longitudinal axis and a plurality of axial elongated corrugations projecting radially from said wall along a part of an axial length of the ring, which is sandwiched between an inner cylindrical surface of an outer member and an outer cylindrical surface of an inner member, the improvements comprising:

an axial retention means projecting from said ring to engage a projecting shoulder on one of said members, said axially retention means comprising at least one radially projecting member, whereby said tolerance ring will engage one of said members along an entire length of said corrugations and will engage the other of said members with said planished cylindrical wall to provide a means for the transfer of torque between said two members and said axial retention means will prevent at least a unidirectional axial movement of said ring relative to the member whose shoulder it engages, said shoulder being captured within axial ends of said ring by said axial retention means, said shoulder having one surface formed by one of said cylindrical surfaces and another surface which is overlayed by said axial retention means; and an angular retention means projecting radially from said ring to engage in a groove in the cylindrical surface of at least one of said members, whereby said angular retention means will prevent angular movement of said ring relative to the members in whose groove it is received.

17. A tolerance ring according to claim 16; wherein said angular axial retention means projects radially from both axial ends of said ring to provide bidirectional axial retention.

18. A tolerance ring according to claim 16, wherein said angular retention means projects radially from at least one of the lateral ends of said ring.

19. A tolerance ring according to claim 18, wherein said angular retention means comprises a radially projecting tab.

20. A tolerance ring according to claim 19, wherein said tab extends the entire width of said ring.

21. A tolerance ring according to claim 19, wherein said tab extends only a portion of the width of said ring.

22. A tolerance ring according to claim 16, wherein said angular retention means projects radially inwardly to engage in a groove in said inner member.

23. A tolerance ring according to claim 16, wherein said retention means projects radially outwardly to engage in a groove in said outer member.

24. A tolerance ring in the form of a split cylinder with axial ends and defining a longitudinal axis and having a plurality of corrugations projecting radially from said cylinder, which is to be sandwiched between an inner cylindrical surface of an outer member and an outer cylindrical surface of an inner member to provide means for the transfer of torque between said two members, comprising axial retention means in the form of at least one member that projects radially from at least one axial end of said ring, each radially projecting member having a circumferential extent of less than one half of the circumference of said ring to engage a projecting shoulder on one of said members, whereby said axial retention means will prevent at least unidirectional axial movement of said ring relative to the member whose shoulder it engages, said axial retention means engaging said shoulder such that said shoulder is captured within said axial ends of said ring by said axial retention means, said shoulder being formed by one of said inner or outer cylindrical surfaces and another surface which is overlayed by said axial retention means.

25. A tolerance ring according to claim 24, wherein said projection is formed on at least one axial end of said ring.

26. A tolerance ring according to claim 24, wherein said projection is formed at both axial ends of said ring.

27. A tolerance ring according to claim 24, wherein said projection comprises a plurality of angularly spaced tabs.

28. A tolerance ring according to claim 24, wherein said projection comprises a plurality of angularly spaced dimples.

29. A tolerance ring according to claim 24, wherein said projection comprises a single radially extending tab formed on a lateral end of said split ring.

* * * * *